United States Patent Office 3,326,977
Patented June 20, 1967

3,326,977
PROCESS FOR PREPARING POLYMERIC SULFIDES
Dee L. Johnson and Delbert D. Reynolds, Rochester, N. Y., assignors to Eastman Kodak Company, Rochester, N.Y., a corporation of New Jersey
No Drawing. Filed Jan. 12, 1962, Ser. No. 165,931
9 Claims. (Cl. 260—584)

This application is a continuation-in-part of the copending Johnson and Reynolds U.S. patent application Serial No. 80,970, filed January 6, 1961, now abandoned.

This invention concerns a process for preparing polymeric sulfides and, more particularly, polymers in which the repeating unit is a derivative of ethylene sulfide. These polymers will hereinafter be referred to as oligoethylene sulfides.

In Reynolds U.S. patent application Serial No. 721,678, filed March 17, 1958, it is shown that introduction of a mercaptoethyl group into a substance such as an amine or mercaptan yields a nonpolymeric mercaptoethyl derivative. The reaction described therein was carried out in a solvent medium such as toluene or dioxane, which medium is nonpolar or very slightly polar.

It is the object of our invention to produce polymeric sulfides. A further object is to introduce into organic substances more than one mercaptoethyl group such that oligoethylene sulfides are obtained.

These objects are accomplished by a process for preparing polymeric sulfides of the general formula X[(CH$_2$—CHR'—S)$_n$H]$_r$ where r may be 1 or 2, R' may be hydrogen, hydroxymethyl, or alkyl (C$_1$-C$_8$), n is an integer from 2 to 20, and X is (a)

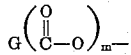

m being 0 to 1, where r is 1, G may be RHN—, RRN—, and ZN—, where R is alkyl (C$_1$-C$_{18}$), cycloalkyl, aralkyl, or aryl and Z may be 4 or 5 carbon or oxygen atoms necessary to complete a heterocyclic ring with N, and when r is 2, G may be

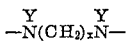

or RRN—N=, where Y is hydrogen or R (defined above) and x is 2 to 18; (b) H$_2$N; (c) HO—; (d) RS— (R defined above); and (e) RO— (R defined above); comprising reacting Q—CO—A—CH$_2$—CHR'—BH, where Q is an alkoxy group of 1 to 18 carbon atoms, or, together with the hydrogen atom of B (i.e. to form QH), is a covalent bond forming a heterocyclic ring; R' is defined as above; and A and B are dissimilar and may be selected from the class consisting of sulfur and oxygen; with a nucleophilic initiating agent chosen from the group consisting of (1) XH, where X is G— (defined above), NaO—, KO—, and NH$_4$O—, and (2) XM, where X is RO— and RS— (R defined above) and M is an alkali metal, in a mercaptide ion-enhancing medium.

The bringing together of the reactants of our process in a medium which enhances or promotes the formation of mercaptide ions is critical for the performance of our invention to produce oligoethylene sulfides. If the reactants are placed in a medium which inhibits the formation of mercaptide ions, such as the media found in Reynolds, application Serial No. 721,678 (now abandoned), mentioned above, then the desired polymerization process does not occur.

The mercaptide ion-enhancing medium is most easily obtained by placing the process reactants in a solvent which induces ionization. Such solvents include alcohols, water, acetonitrile, propionitrile, dialkylformamides, and the like. In general solvents considered polar solvents are operable. It will be readily apparent that in many instances the desired medium is obtained from one of the process reactants. For example, when the process reactant is itself an alcohol, a mercaptan, or a strongly basic amine, such as aliphatic amines or hydrazines, then additional solvent is optional and may even be a nonpolar or weakly-polar one. For certain process reactants such as weakly-basic amines, e.g. aromatic amines, the mercaptide ion formation is induced by the addition to the reaction mass of an alkali metal alkoxide, for example sodium methoxide. In any of above-mentioned routes, the necessary mercaptide ion-promotion medium is established for the reactants and the desired polymerization process is operable therein.

One of the reactants necessary for operating our process is Q—CO—A—CH$_2$—CHR'—BH in which Q is an alkoxy group of 1 to 18 carbon atoms, or, together with the hydrogen atom of B (i.e. to form QH), is a covalent bond forming a heterocyclic ring; R' is hydrogen, hydroxymethyl or alkyl (C$_1$-C$_8$); and A and B are dissimilar and may be selected from the class consisting of sulfur and oxygen. Representative compounds which we find useful include ethylene monothiolcarbonate,

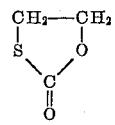

substituted ethylene monothiolcarbonates, alkyl 2-hydroxyalkylthiolcarbonates, and alkyl 2-mercaptoethylcarbonates. Alkyl 2-hydroxyalkylthiolcarbonates may be prepared by reacting alkyl chloroformate with 2-mercaptoethanols, such as 2-mercaptoethanol, 3-mercapto-1,2-propanediol, 1-mercapto-2-propanol, 1-mercapto-2-butanol, 1-mercapto-2-hexanol, 1-mercapto-2-heptanol, 1-mercapto-2-decanol, and the like, in the presence of an alkali metal base such as sodium hydroxide, potassium hydroxide, or lithium hydroxide. The reaction is preferably carried out at a pH of 6 to 8, but may be varied. A two-phase solvent system is used employing water and an immiscible inactive solvent, such as benzene, petroleum ether, or the like. The alkyl 2-mercaptoethylcarbonates are prepared by isomerizing the corresponding alkyl 2-hydroxyethylthiolcarbonates. For example, n-hexyl 2-mercaptoethylcarbonate may be prepared in a 200-ml. flask equipped with a 14-inch packed column, and a variable-rate still-head. In the flask is placed 103 grams (0.5 mole) of n-hexyl 2-hydroxyethylthiolcarbonate and 0.002 gram of uranyl acetate. The system is placed under vacuum and distilled, producing 85 grams or 82 percent yield of n-hexyl 2-mercaptoethylcarbonate (boiling point 75°/0.2 mm., refractive index 1.4542, 99.5 percent pure by iodometric titration). Similarly treating 2-mercapto-1,3-propanediol or 2- mercapto-1-alkanols with an alkyl chloroformate yields alkyl 1- hydroxymethyl - 2 - hydroxyethylthiolcarbonate or alkyl 1-alkyl - 2 - hydroxyethylthiolcarbonate, which on isomerization yield, respectively, alkyl 2-hydroxymethyl - 2 - mercaptoethylcarbonate and alkyl 2-alkyl-2-mercaptoethylcarbonates. Ethylene monothiolcarbonate may be prepared from phosgene and 2-mercaptoethanol as described in U.S. Patent No. 2,828,-318 (Reynolds) which issued March 25, 1958. Similarly hydroxymethyl and alkyl substituted ethylene monothiolcarbonates may be obtained by replacing 2-mercaptoethanol with the appropriately substituted 2-mercaptoethanolic compound. The preferred members of the Q—CO—A—CH$_2$—CHR'—BH family are ethyl 2-mercaptoethylcarbonate, ethylene monothiolcarbonate, and ethyl 2-hydroxyethylthiolcarbonate.

The other reactant of our process is a nucleophilic initiating agent chosen from the group consisting of (1)

XH, where X is G— (defined above), NaO—, KO—, and NH₄O—, and (2) XM, where X is RO— and RS— (R defined above) and M is an alkali metal. Representative examples of nucleophilic initiating agents which are operable in our process include primary and secondary aliphatic, alicyclic, aromatic, aralkyl and heterocyclic amines; primary and secondary aliphatic and heterocyclic diamines; aliphatic and aromatic hydrazines; sodium hydroxide; potassium hydroxide; ammonium hydroxide; the sodium, potassium, or lithium salts of alkanols, cycloalkanols, aralkanols, phenols and the like; and the sodium, potassium, or lithium salts of mercaptans such as alkanethiols, cycloalkanethiols, aralkanethiols, thiophenols, and the like. When the nucleophilic initiating agent contains more than one functional group as in alkanolamines, mercaptoalkanols, and the like, the hydroxyl group being the least strong initiator is to be considered for the purposes of our invention only a substituent of the amine, mercaptan, and the like. In certain instances it will be convenient to prepare the nucleophilic initiating agent in situ by adding convenient precursors to the reaction vessel. For example, ammonia and water may be used for in situ ammonium hydroxide. Similarly free alcohol or mercaptan and alkali metal or alkali metal alkoxide may be added as a pair to obtain the ROM or RSM in situ. Our preferred nucleopholic initiating agents include ethonolamine, N-methylethanolamine, diethanolamine, 2-amino-2-methyl-1-propanol, 2-amino-2-methyl-1,3 - propanediol, 2-amino - 2 - (hydroxymethyl) - 1,3 - propanediol, n-decylamine, cyclohexylamine, morpholine, ethylamine, diethylamine, benzylamine, aniline, $\alpha,\alpha,\alpha$-trifluorotoluidine, ethylenediamine, piperazine, N,N-dimethylhydrazine, sodium hydroxide, ethanol (as the alkoxide), benzyl alcohol (as the alkoxide), 1-butanethiol (as the alkali metal mercaptide), p-thiocresol (as the alkali metal mercaptide), and 3-mercapto-1,2-propanediol (as the alkali metal mercaptide).

In general the process for preparing oligoethylene sulfides is conveniently simple. The reactants with or without additional solvent, as needed to produce the mercaptide ion-promoting medium, are mixed in a vessel at room temperature and the nucleophilic initiating agent induces practically instantaneous reaction. To achieve highest yields of polymer, one may optionally heat at reflux temperature of any liquid present in the reaction vessel for a short period, say one to two hours. Any remaining extraneous liquids, such as original solvent or unchanged starting reactant, may be removed by distillation at reduced pressures, the desired polymer remaining. In many instances, the molecular weight of the polymer is such that the desired polymeric product precipitates from the reaction medium and may be separated by simple filtration.

In certain instances the structure of the desired polymeric product can influence the choice of reaction conditions. When the nucleophilic agent is an unhindered amine, for example n-butylamine, an intermediate 2-mercaptoethyl N-n-butylcarbamate forms rapidly and in temporary excess, in the reaction with ethylene monothiolcarbonate. This intermediate is strongly nucleophilic and, being present in an excess, leads to the oligoethylene sulfide

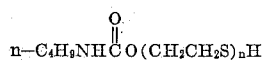

(i.e. in general formula

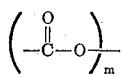

$m=1$). When the amine is hindered, for example tert.-butylamine, the intermediate, 2-mercaptoethyl N-tert.-butylcarbamate, is not formed rapidly and in excess, and the original hindered amine remains the nucleophilic agent producing the oligoethylene sulfide tert.

$$C_4H_9NH(CH_2CH_2)_nH$$

(i.e. in general formula

$m=0$). To obtain aminooligoethylene sulfide (i.e. $m=0$) from an unhindered amine like n-butylamine, the amine nucleophilic initiating agent must be kept in excess by the simple expediency of placing it in the reaction vessel first and slowly adding ethyl 2-mercaptoethylcarbonate to obtain n-$C_4H_9NH(SH_2CH_2S)_nH$ (i.e.

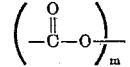

$m=0$).

The oligoethylene sulfides prepared by the process of our invention are useful silver complexing agents and can be used in various photographic systems. In electrophotography, these polymers are especially valuable as constituents in electrolytic developing solutions for single-step direct image-forming photoconductographic processing as described in D. L. Johnson et al., U.S. Serial No. 117,125, filed June 14, 1961, now U.S. Patent No. 3,072,542. In silver halide photographic systems they are useful as fixers or stabilizers. In silver halide diffusion transfer processing they improve the tone of silver images.

The following examples are intended to illustrate our invention but not to limit it in any way.

*Example 1.—1,1 - dimethyl - 2 - hydroxyethylamino-oligoethylenesulfide*

One mole (89 g.) of 2-amino-2-methyl-1-propanol was dissolved in 1 liter of dioxane brought to reflux under an effective condenser as 1 mole (150 g.) of ethyl-2-mercaptoethylcarbonate was added dropwise in 1.5 hours. The mixture was refluxed 0.5 hour, then stripped of solvent and some excess amine. The product (99 g.) was the residue in the flask with an average molecular weight (by $I_2$ titration) of 263 or 2.9 repeating ethylene sulfide units.

*Example 2.—1,1(dihydroxymethyl) ethylamino-oligoethylenesulfide*

To a solution of 1 mole (105 g.) 2-amino-2-methyl-1,3-propanediol in 1 liter of dioxane at reflux under an effective condenser was added 1 mole (150 g.) ethyl-2-mercaptoethylcarbonate dropwise in 1.5 hour. The mixture was refluxed an additional 0.5 hour then stripped of solvent under aspirator vacuum. The product was the residue in the flask with a molecular weight of 311 or 3.43 repeating ethylene sulfide units.

*Example 3.—Tris-(hydroxymethyl) methylamino-oligoethylenesulfide*

To a refluxing solution of 121 g. (1 mole) 2-amino-2-hydroxymethyl-1,3-propanediol and 500 ml. dioxane-500 ml. tetrahydrofurfuryl alcohol was added 150 g. (1 mole) ethyl 2-mercaptoethylcarbonate dropwise in 1 hour. The reaction mixture was refluxed 1 hour additional and stripped of solvent. The product was the residue in the flask, 174 g. with a molecular weight 293 or 4.88 repeating ethylene sulfide units.

*Example 4.—2-hydroxyethylamino-oligoethylene sulfide*

Three moles (180 g.) 2-aminoethanol were dissolved in 1.4 liter of toluene and 800 ml. of dioxane and brought to reflux under an efficient condenser. To this solution was added 1 mole (150 g.) of ethyl 2-mercaptoethylcarbonate dropwise in 2.5 hours. After addition the mixture was refluxed 2 hours. The solvent and excess amine were stripped by vacuum distillation leaving 104 g. of a viscous oil $N_D^{25}$ 1.5338. By iodometric titration the product had an average molecular weight of 142 which indicates an average of 1.35 repeating ethylene sulfide units. The calc. value for $C_2H_7NO(C_2H_4S)_{1.35}$ is C, 39.4; H, 8.7; N, 9.9; S, 30.4. Found: C, 39.6; H, 8.8; N, 9.9; S, 29.9.

*Example 5.—n-Butylamino-oligoethylene sulfide*

To a refluxing solution of 15 g. (0.2 mole) n-butylamine 30 ml. water and 200 ml. methanol was added dropwise in 30 minutes. 30 g. (0.2 mole) ethyl 2-mercaptoethylcarbonate. Refluxed 1 hour during which time the alcohol was boiled off. Cold water was added and the white powder was collected having a molecular weight of 690 or 10.4 repeating ethylene sulfide units.

*Example 6.—n-Decylamino-oligoethylene sulfide*

Sixteen grams (0.1 mole) n-decylamine, 100 ml. methanol and 100 ml. water were refluxed on a steam bath while 30 g. (0.2 mole) ethyl 2-mercaptoethylcarbonate was added dropwise in 30 minutes. After refluxing an additional hour the white solid was collected after adding ice and washed with ethanol yielding 13 g. of product with a molecular weight of 1214 or 17.2 repeating ethylene sulfide units.

*Example 7.—Amino-oligoethylene sulfide*

Ethyl 2-mercaptoethyl carbonate, 60 g. (0.4 mole) was added dropwise in 30 minutes to 250 ml. concentrated ammonium hydroxide at 40°. After the addition was complete 250 ml. concentrated ammonium hydroxide was added and the thick mixture was heated 15 min. on a steam bath. The white product was collected by vacuum filtration, washed with cold water to yield a powder with a molecular weight of 471 or 7.6 repeating ethylene sulfide units.

*Example 8.—Bis(2-hydroxyethyl) amino-oligoethylene sulfide*

To a vigorously refluxing mixture of 105 g. (1 mole) 2,2'-iminodiethanol and 0.5 liter dioxane under an effective condenser was added 150 g. (1.0 mole) ethyl 2-mercaptoethylcarbonate dropwise in 1 hour. The reaction was refluxed 1 hour, stripped of solvent leaving 120 g. of product having a molecular weight of 347 or 5.79 repeating ethylene sulfide units.

*Dimethylamino-oligoethylene sulfide*

Twenty two grams (0.5 mole) dimethyl amine were dissolved in 500 ml. water, warmed on a steam bath to which was added 150 g. (1.0 mole) ethyl 2-mercaptoethyl carbonate dropwise in 1 hour with an additional 2 hour reflux. The white powdery product had a molecular weight of 495 or 7.5 repeating ethylene sulfide units.

*Di-n-dodecylamino-oligoethylene sulfide*

To a refluxing solution of 35.3 g. (0.1 mole) di-n-dodecylamine and 500 ml. methanol was added 75 g. (0.5 mole) ethyl 2-mercaptoethylcarbonate dropwise in 30 minutes. After refluxing overnight a soft solid product was obtained with a molecular weight of 679 or 5.43 repeating ethylene sulfide units.

*Example 9.—Benzylamino-oligoethylene sulfide*

To 27 g. (0.25 mole) of benzylamine in 250 ml. water and 250 ml. methanol vigorously refluxing on a steam bath under an effective condenser was added 150 g. (1 mole) of ethyl 2-mercaptoethylcarbonate dropwise in 1 hour. The reaction was refluxed overnight and the white solid present was collected by vacuum filtration and had a molecular weight of 487 or 6.34 repeating ethylene sulfide units.

*Example 10.—N-methylbenzylamino-oligoethylene sulfide*

To a refluxing solution of 30 g. (.25 mole) N-methylbenzylamine, 250 ml. water, and 250 ml. methanol was added 150 g. (1.0 mole) ethyl 2-mercaptoethylcarbonate dropwise in 1 hour. The mixture was refluxed 2 hours more and the white solid collected had a molecular weight of 456 or 5.58 repeating ethylene sulfide units.

*Example 11.—Ethyl mercapto-oligoethylene sulfide*

Six grams (0.25 mole) sodium was dissolved in 175 ml. ethanol to which was added 16 g. (0.25 mole) ethanethiol. This solution was refluxed on a steam bath and 150 g. (1.0 mole) ethyl 2-mercaptoethylcarbonate was added dropwise in 1 hour. After 1 hour additional refluxing the white solid was collected by vacuum filtration, 68 g. with a molecular weight of about 533 or 12 repeating ethylene sulfide units.

*Example 12.—Mercapto-oligoethylene sulfide*

Hydrogen sulfide was passed into 500 ml. of heated (steam bath) concentrated ammonium hydroxide solution for 30 min. To this was added 150 g. (1 mole) ethyl 2-mercaptoethylcarbonate dropwise in 30 min. The mixture was then refluxed overnight and a white polymeric powder collected with a molecular weight of 531 or 8.3 repeating ethylene sulfide units.

*Example 13.—Benzylmercapto-oligoethylene sulfide*

To a solution of 30 g. (0.25 mole) of benzenemethanethiol 11 g. (0.25 mole) sodium methoxide and 300 ml. N-methylpyrrolidone heated on a steam bath was added 225 g. (1.5 mole) ethyl 2-mercaptoethylcarbonate dropwise in 3 hours. A clear solution resulted which upon cooling precipitated 98 g. of white solid which was triturated with ether. The solid has a molecular weight of 1200 or 18 repeating ethylene sulfide units.

*Example 14.—N-ethylanilino-oligoethylene sulfide*

Three moles (363 g.) of N-ethylaniline, 500 ml. toluene, 1 g. (0.02 mole) sodium methoxide and 150 g. (1.0 mole) ethyl 2-mercaptoethylcarbonate were changed in an autoclave and heated to 150° for three hours. The solution was filtered to remove a gray water-soluble precipitate and stripped of solvent and excess amine. A yellow viscous oil was the pot residue and had a molecular weight of 357 or 3.9 repeating ethylene sulfide units.

*Example 15.—2-(ethoxyethoxy)-ethoxy-oligoethylene sulfide*

Six grams (0.3 mole) sodium was added to 500 ml. 2-(ethoxyethoxy)-ethanol and heated on a steam bath. To this solution was added 150 g. (1.0 mole) ethyl 2-mercaptoethylcarbonate dropwise in 1 hour. Subsequently the reaction was refluxed 1 hour. The white precipitate was collected by vacuum filtration triturated with ether yielding 60 g. with a molecular weight of 1109 or 16.3 repeating ethylene sulfide units.

*Example 16.—Ethoxyoligoethylene sulfide*

Six grams (0.3 mole) sodium was dissolved in 175 ml. ethanol brought to reflux and 36 g. (0.24 mole) ethyl 2-mercaptoethylcarbonate added dropwise in 30 min. After an additional 30 min. reflux the white polymeric powder was collected, triturated in ether and had a molecular weight of 440 or 5.57 repeating ethylene sulfide units.

*Example 17.—Benzyloxyoligoethylenesulfide*

A solution of 6 g. (0.3 mole) sodium and 500 ml. benzyl alcohol was heated on a steam bath while 150 g. (1.0 mole) ethyl 2-mercaptoethylcarbonate was added dropwise in 1 hour. The mixture was refluxed overnight and upon cooling a soft solid with a molecular weight of 763 or 10.9 repeating ethylene sulfide units was collected.

*Example 18.—Hydroxy-oligoethylene sulfide*

The dropwise addition of 37.5 g. (0.25 mole) ethyl 2-mercaptoethylcarbonate in 30 min. to a solution of 10 g. (0.25 mole) sodium hydroxide and 300 ml. water heated on a steam bath quickly formed a white solid. After an additional 30 min. reflux the solid was collected and found to have a molecular weight of 346 or 5.5 repeating ethylene sulfide units.

*Example 19.—Phenoxy-oligoethylene sulfide*

To a solution of 219 g. phenol and 16 g. (0.25 mole) sodium methoxide heated on a steam bath was added dropwise in 10 minutes, 75 g. (0.5 mole) ethyl 2-mercaptoethylcarbonate. The white mass liquified and was refluxed 1 hr. and while hot filtered, triturated with 100 ml. ether, then 100 ml. acetone to give 23 g. of white powder with a molecular weight of 1192 or 18.3 repeating ethylene sulfide units.

*Example 20.—N-butylamino-oligoethylene sulfide*

Fifteen grams (0.2 mole) n-butylamine, 250 ml. methanol, and 250 ml. water were refluxed on a steam bath. To this solution was added 30 g. (0.2 mole) ethyl 2-hydroxyethylthiolcarbonate dropwise in 20 min. The refluxing was continued 45 min. as the white solid precipitated from solution, was subsequently collected, triturated in water and when dry 12.5 g. had a molecular weight of 740 or 11.1 repeating ethylene sulfide units.

*Example 21.—Benzylmercapto-oligoethylene sulfide*

Ethyl 2-hydroxyethylthiolcarbonate (150 g., 1.0 mole) was added dropwise in 30 min. to a refluxing solution of 30 g. (0.2 mole) benzenemethanethiol and 11 g. (0.2 mole) sodium methoxide in 250 ml. each of methanol and water. After the addition was complete the mixture was refluxed 48 hours, then concentrated to dryness on a Rinco evaporator and triturated with 1 l. ethanol. The white powdery solid had a molecular weight of 568 or 7.41 repeating ethylene sulfide units.

*Example 22.—Ethylcarbamoyloxy-oligoethylene sulfide*

Fifty ml. of 33% aqueous ethylamine was stirred with 10.4 gm. of ethylene monothiolcarbonate. A fast reaction ensued and the white oligomer separated. After one hour it was filtered and dried. A strong carbonyl band in the region of 5.96 microns indicated the carbamate structure, $C_2H_5NHCO_2(CH_2CH_2S)_nH$.

*Example 23.—n-Butylcarbamolyloxy-oligoethylene sulfide*

One-half mole of ethylene monothiolcarbonate and 1.5 mole of n-butylamine was refluxed in a mixture of 500 ml. of methanol and 500 ml. of water. After 6 hours the solid was separated and dried. Iodometric titration gave an apparent molecular weight of 42.2. A strong carbonyl was shown at 5.96 microns. These data along with elemental analysis indicated its structure as $$n-C_4H_9NHCO_2(CH_2CH_2S)_5H$$

*Example 24.—Isopropylcarbamoyloxy-oligoethylene sulfide and isopropylamino-oligoethylene sulfide*

One-half mole of ethylene monothiolcarbonate and 1.5 mole of isopropylamine were refluxed together for six hours in a mixture of 500 ml. of methanol and 500 ml. of water. The dried oligomer had an apparent molecular weight of 540. Infrared and elemental analysis indicated that it was a mixture of the oligomers, $$(CH_3)_2CHNHCO_2(CH_2CH_2S)_nH \text{ and}$$
$$(CH_3)_2CHNH(CH_2CH_2S)_nH$$

*Example 25.—tert.Butylamino-oligoethylene sulfide*

One-half mole of ethylene monothiolcarbonate and 1.5 moles of tert.butylamine were refluxed together in a mixture of 500 ml. of methanol and 500 ml. of water. The dried, white oligomer showed an apparent molecular weight of 503. Its infrared showed no carbonyl band. These data along with elemental analysis indicated the structure tert. $C_4H_9NH(CH_2CH_2S)_7H$.

*Analysis.*—Calcd. for above structure: C, 43.8; H, 7.9; N, 2.8; S, 45.4. Found: C, 43.4; H, 7.9; N, 2.5; S, 45.1.

*Example 26.—Carbamoyloxy-oligoethylene sulfide*

One-half mole of ethylene monothiolcarbonate was stirred into a mixture of 200 ml. of 28% $NH_4OH$ and 200 ml. of water. A white oligomer separated within a few minutes. The washed and dried product gave a molecular weight of 297.

In a second experiment the ethylene monothiolcarbonate was added dropwise over a 45 minute period. The apparent molecular weight was 156. The infrared curves were identical for both products and indicated the structure to be $H_2NCO_2(CH_2CH_2S)_nH$.

*Example 27.—n-Octylcarbamoyloxy-oligoethylene sulfide*

One-tenth mole of ethylene monothiolcarbonate and 0.1 mole of n-octylamine refluxed together for 5 hours in a mixture of 75 ml. of methanol and 75 ml. of water. The polymer was washed and dried. The infrared exhibited a very strong carbonyl indicating the structure to be $n-C_8H_{17}NHCO_2(CH_2CH_2S)_nH$.

*Example 28.—Benzylcarbamoyloxy-oligoethylene sulfide*

Example 27 was repeated in which the n-octylamine was replaced by benzylamine. Infrared analysis indicated the structure to be $C_6H_5CH_2NHCO_2(CH_2CH_2S)_nH$. It had a molecular weight of 381. An oligomer of the same structure was obtained when the ethylene monothiolcarbonate was added dropwise over a 60 minute period.

*Example 29.—N-methylbenzylamino-oligoethylene sulfide*

Example 28 was repeated using N-methylbenzylamine instead of benzylamine. The oligomer was an oil with the structure

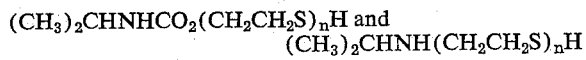

*Example 30.—Diethylamino-oligoethylene sulfide*

One-half mole of ethylene monothiolcarbonate and one-half mole of diethylamine were stirred together for 1 hour in a mixture of 200 ml. of water plus 200 ml. of methanol. The white oligomer was washed and dried. It contained no carbonyl and its structure is $$(C_2H_5)_2N(CH_2CH_2S)_nH$$

A second experiment identical in all respects except that the ethylenemonothiolcarbonate was added dropwise had an identical infrared spectrum.

*Example 31.—Di-n-butylamino-oligoethylene sulfide*

One-tenth mole of di-n-butylamine and 0.1 mole ethylene monothiolcarbonate were refluxed together for 5 hours in 150 ml. of a 1:1 mixture of methanol and water. The white oligomer contained no carbonyl. The structure was shown to be $(n-C_4H_9)_2N(CH_2CH_2S)_nH$.

*Example 32.—Di-sec.butylamino-oligoethylene sulfide*

This was identical to Example 31 excepting that disec.butylamino was used instead of di-n-butylamine. There was no carbonyl band in the infrared. The structure was shown to be

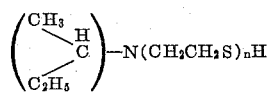

*Example 33.—Morpoholinocarbonyloxy-oligoethylene sulfide*

One-half mole of ethylene monothiolcarbonate plus 1.5 mole of morpholine was refluxed for six hours in a mixture of 500 ml. of water plus 500 ml. of methanol. There was little solid present at this stage. The reaction mixture was distilled through a 14″ Vigreux column. After removal of solvents and excess morpholine, 33 g. product was obtained. It was shown by infrared and elemental analysis to be

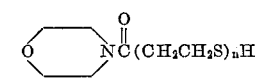

The molecular weight was 286.

Example 34.—*Piperidinocarbonyloxy-oligoethylene sulfide*

One-tenth mole of piperidine and 0.1 mole of ethylene monothiolcarbonate were refluxed together for 5 hours in a mixture of 75 ml. methanol and 75 ml. of water. The solid was washed and dried. It exhibited a strong carbonyl band and proved to be

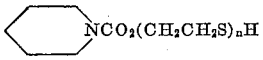

Example 35.—*n-Decylcarbamoyloxy-oligoethylene sulfide*

One-tenth mole of n-decylamine and 0.1 mole of ethylene monothiolcarbonate were reacted in 200 ml. of a 1:1 mixture of methanol and water. The ethylene monothiolcarbonate was added dropwise over a 20 minute period. The molecular weight was 1135 by iodometric titration in dimethylformamide. The structure is $$\text{n--}C_{10}H_{21}\overset{H}{N}CO_2(CH_2CH_2S)_nH$$

Example 36.—*Propylcarbamoyloxy-olgioethylene sulfide*

One-tenth mole of ethylene monothiolcarbonate and 0.1 mole of propylamine were refluxed together for five hours in a mixture of 75 ml. of methanol and 75 ml. of water. The white oligomer was washed with water and dried. A strong carbonyl band was exhibited at about 5.95 microns. The structure was shown to be $$C_3H_7NHCO_2(CH_2CH_2S)_nH$$

Example 37.—*Hydroxy-oligoethylene sulfide*

One-half mole of ethylene monothiolcarbonate was stirred into a mixture of 200 ml. of 5% aqueous NaOH plus 200 ml. of dioxane. After 2 hours the oligomer was separated and washed. The product contained no carbonyl group. Its structure was $HO(CH_2CH_2S)_nH$.

From a similar run in which the ethylene monothiolcarbonate was added dropwise over a one-hour period an oligomer of similar structure was obtained. An iodometric titration indicated a molecular weight of 369.

Example 38.—*Ethoxy-oligoethylene sulfide*

0.5 moles of ethylene monothiolcarbonate was added dropwise over a period of 1 hour to 6 g. of sodium dissolved in 800 ml. of ethanol. An oligomer having the structure $C_2H_5O(CH_2CH_2S)_nH$ separated immediately.

Example 39.—*2-(ethoxyethoxy)ethoxyoligoethylene sulfide*

Six grams of sodium was dissolved in 500 ml. of 2-(ethoxyethoxy)ethanol. This solution was heated on a steam bath and 0.5 moles of ethylene monothiolcarbonate was added dropwise. The oligomer which formed had no carbonyl in its infrared spectrum and has the following structure: $C_2H_5OC_2H_4OC_2H_4O(CH_2CH_2S)_nH$.

Example 40.—*n-Decylmercapto-oligoethylene sulfide*

Six grams of sodium was dissolved in a mixture of 300 ml. of ethanol and 0.25 moles of 1-n-decanethiol. This solution was refluxed and 0.5 moles of ethylene monothiolcarbonate was added over a period of 1 hour. The oligomer showed no carbonyl band in the infrared spectrum. It has the structure n-$C_{10}H_{21}S(CH_2CH_2S)_nH$.

Example 41.—*Benzylmercapto-oligoethylene sulfide*

This preparation was similar to that described in Example 40 except benzenemethanethiol was used instead of 1-n-decanethiol. The oligomer contained no carbonyl and has the structure $C_6H_5CH_2S(CH_2CH_2S)_nH$.

Example 42.—*Phenylmercapto-oligoethylene sulfide*

This preparation was similar to that disclosed in Example 40 except that thiophenol was used instead of 1-n-decanethiol. The oligomer had the structure $$C_6H_5S(CH_2CH_2S)_nH$$

Example 43.—*Phenoxy-oligoethylene sulfide*

Ten grams of phenol containing 0.25 gm. of sodium was warmed until the sodium dissolved. One hundred ml. of dioxane and 10.4 g. of ethylene monothiolcarbonate was added. The solution was refluxed for 5 hrs. The oligomer was a low molecular weight oil.

Example 44.—*Didodecylamino-oligoethylene sulfide*

One-tenth mole of didodecylamine was refluxed for 5 hrs. in 100 ml. of methanol containing 0.2 moles of ethylene monothiolcarbonate. A low molecular weight oil of the structure $(C_{12}H_{25})_2N(CH_2CH_2S)_nH$ was obtained.

Example 45.—*Mercapto-oligoethylene sulfide*

Four grams of sodium hydroxide was dissolved in 200 ml. of a 1:1 mixture of water and ethanol. The mixture was saturated with hydrogen sulfide and then warmed on a steam bath while 10.4 g. of ethylene monothiolcarbonate was added dropwise over a 1 hour period. After 2 additional hours heating, the oligomer was separated. washed and dried. It has the structure $HS(CH_2CH_2S)_nH$ as indicated by elemental analysis and the infrared spectrum.

Example 46.—*1,1-dimethylhydrazinobis-oligoethylene sulfide*

To a refluxing solution of 1,1-dimethylhydrazine (180.3 g., 3.0 mole) was added 104 g. (1.0 mole) ethylene monothiolcarbonate dropwise in 1 hour. A vigorous reaction ensued precipitating 50 g. of white powder which had a molecular weight 668 for a secondary amine with one oligoethylene sulfide chain. Elemental analysis and infrared spectroscopy (absence of the 2.9 micron band for secondary amine) indicates that the product is the bis-(oligoethylene sulfide) with the average chain length of 10 units.

Calc. for $C_{42}H_{88}N_2S_{20}$: C, 40.4; H, 7.5; N, 2.1; S, 49.8. Found: C, 40.4; H, 7.1; N, 1.8; S, 50.1.

Example 47.—*Benzyloxy-oligoethylene sulfide*

Six grams (0.3 mole) sodium was dissolved in 500 ml. benzyl alcohol and heated on a steam bath under an effective condenser. To this solution was added 104 g. (1.0 mole) ethylenemonothiolcarbonate in one portion. The reaction mixture became jelly-like and was heated 48 hrs. on a steam bath. Upon cooling and stirring with 500 ml. diethylether 120 g. white powdery solid precipitated with a molecular weight of 606 or the benzylether with 8.3 repeating ethylene sulfide units.

Example 48.—*tert.Octadecylamino-oligoethylene sulfide*

Ten grams of tert.octadecylamine and 500 ml. methanol were vigorously refluxed on a steam bath while 104 g. (1.0 mole) ethylene monothiolcarbonate was added in one portion. The clear solution was refluxed 24 hours and upon concentration a white powder separated having a molecular weight of 901 or 9.6 repeative ethylene sulfide units.

The invention has been described in considerable detail with particular reference to preferred embodiments thereof, but it will be understood that variations and modifications can be effected within the spirit and scope of the invention as described hereinabove and as defined in the appended claims.

We claim:

1. A process for preparing a compound having the formula $$X[(CH_2\text{---}CHR'\text{---}S)_nH]_r$$

wherein $r$ is an integer of from 1 through 2, R' is selected from the group consisting of hydrogen, hydroxymethyl, and alkyl of from 1 through 8 carbon atoms, $n$ is an integer of from 2 through 20, and X is (a) G(COO)$_m$—, wherein $m$ is from 0 through 1, wherein, when $r$ is 1, G is selected from the group consisting of RHN—, RRN,

and

wherein, when $r$ is 2, G is selected from the group consisting of $$-\overset{\overset{Y}{|}}{N}(CH_2)_x\overset{\overset{Y}{|}}{N}-$$

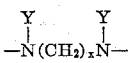

and RRN—N=, wherein Y is selected from the group consisting of hydrogen and R, and $x$ is an integer of from 2 through 18, (b) H$_2$N—
(c) HO—
(d) RS—, and
(e) RO—, wherein in (a), (d), and (e), R is selected from the group consisting of alkyl of from 1 through 18 carbon atoms, cyclohexyl, cyclopentyl, benzyl, and phenyl, which process comprises reacting, in a mercaptide ion-enhancing medium, (I) a sulfide selected from the group consisting of Q—CO—A—CH$_2$—CHR'—BH and

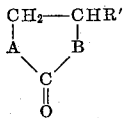

wherein Q is alkoxy of from 1 through 18 carbon atoms, A and B are dissimilar and are selected from the group consisting of sulfur and oxygen, and R' is selected from the group consisting of hydrogen, hydroxymethyl, and alkyl of from 1 through 8 carbon atoms and (II) a nucleophilic initiating agent selected from the group consisting of (i) XH wherein X is selected from the group consisting of RHN—, RRN,

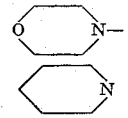

NaO—, KO—, and NH$_4$O—, (ii)

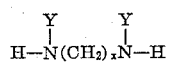

wherein Y is selected from the group consisting of hydrogen and R as above defined, (iii)

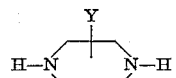

wherein Y is selected from the group consisting of hydrogen and R as above defined, (iv) RRN—NH$_2$ wherein R is as above defined, and
(v) XM wherein X is selected from the group consisting of RO—, and RS— wherein R is as above defined and M is an alkali metal.

2. A process according to claim 1 in which the mercaptide ion-enhancing medium is a solvent which induces ionization.

3. A process according to claim 1 in which the starting material is ethyl 2-mercaptoethylcarbonate.

4. A process according to claim 1 in which the starting material is ethylene monothiolcarbonate.

5. A process according to claim 1 in which the starting material is ethyl 2-hydroxyethylthiolcarbonate.

6. Process for preparing 1,1(dihydroxymethyl)ethylamino-oligoethylene sulfide which comprises reacting 2-amino-2-methyl-1,3-propanediol and ethyl-2-mercaptoethylcarbonate.

7. Process of preparing tris(hydroxymethyl)methylaminooligoethylene sulfide which comprises reacting 2-amino - 2 - hydroxymethyl - 1,3 - propanediol and ethyl 2-mercaptoethylcarbonate.

8. Process of preparing 2-hydroxyethylaminooligoethylene sulfide which comprises reacting 2-aminoethanol and ethyl 2-mercaptoethylcarbonate.

9. Process of preparing 1,1-dimethylhydrazinobisoligoethylene sulfide which comprises reacting 1,1-dimethylhydrazine and ethylene monothiolcarbonate.

References Cited
UNITED STATES PATENTS 2,448,767   9/1948   Carlson _____ 260—327
3,072,676   1/1963   Johnson et al. _____ 260—327

CHARLES B. PARKER, *Primary Examiner.*
R. L. RAYMOND, J. W. MOLASKY,
*Assistant Examiners.*

UNITED STATES PATENT OFFICE
CERTIFICATE OF CORRECTION

Patent No. 3,326,977            June 20, 1967

Dee L. Johnson et al.

It is hereby certified that error appears in the above numbered patent requiring correction and that the said Letters Patent should read as corrected below.

Column 1, lines 44 and 45, after "$-\overset{Y}{N}(CH_2)_x\overset{Y}{N}-$" insert

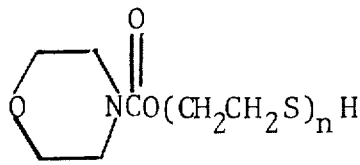

, column 3, lines 26 and 27, for "ethonolamine" read -- ethanolamine --; column 4, line 14, for "$(SH_2CH_2S)$" read -- $(CH_2CH_2S)$ --; column 8, line 54, for "sec. butylamino" read -- sec. butylamine --; lines 72 to 74, the formula should appear as shown below instead of as in the patent:

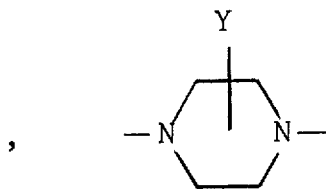

column 9, line 62, for "$n-C_{10}H_{21}S(CH_2CH_2S)_nH$" read -- $\underline{n}-C_{10}H_{21}S(CH_2CH_2S)_nH$ --; column 10, line 22, for "separated." read -- separated, --; column 11, line 46, for "RRN" read -- RRN―― --.

Signed and sealed this 22nd day of October 1968.

(SEAL)
Attest:

EDWARD M. FLETCHER, JR.          EDWARD J. BRENNER
Attesting Officer              Commissioner of Patents